Oct. 21, 1952      W. O. LYTLE      2,614,944
METHOD OF APPLYING ELECTROCONDUCTIVE FILMS
Filed July 22, 1947      4 Sheets-Sheet 1

Inventor
WILLIAM O. LYTLE
By Olen E. Bee
Attorney

Oct. 21, 1952     W. O. LYTLE     2,614,944
METHOD OF APPLYING ELECTROCONDUCTIVE FILMS
Filed July 22, 1947     4 Sheets-Sheet 2

INVENTOR.
WILLIAM O. LYTLE
BY Olen E. Bee
ATTORNEY.

Oct. 21, 1952 W. O. LYTLE 2,614,944
METHOD OF APPLYING ELECTROCONDUCTIVE FILMS
Filed July 22, 1947 4 Sheets-Sheet 3

INVENTOR.
WILLIAM O. LYTLE
BY Olen E. Bee
ATTORNEY.

Oct. 21, 1952 W. O. LYTLE 2,614,944
METHOD OF APPLYING ELECTROCONDUCTIVE FILMS
Filed July 22, 1947 4 Sheets-Sheet 4

INVENTOR.
WILLIAM O. LYTLE
BY Olen E. Bee
ATTORNEY.

Patented Oct. 21, 1952

2,614,944

UNITED STATES PATENT OFFICE 2,614,944

METHOD OF APPLYING ELECTRO-CONDUCTIVE FILMS

William O. Lytle, New Kensington, Pa., assignor to Pittsburgh Plate Glass Co., Allegheny County, Pa., a corporation of Pennsylvania Application July 22, 1947, Serial No. 762,658

7 Claims. (Cl. 117—54)

This application contains subject matter which is also disclosed in my co-pending application S. No. 762,659, filed on the same date, and is a continuation-in-part of S. No. 669,535, filed May 14, 1946, and now U. S. Patent #2,583,000.

This invention is concerned with the production of electroconductive films upon various articles, particularly ceramic or refractory articles such as glass. In United States Letters Patent No. 2,118,795, granted to J. T. Littleton, on May 24, 1938, a process has been described wherein an aqueous solution of stannic chloride is sprayed upon the surface of a heated glass insulator (probably of borosilicate glass) whereby to produce an electroconductive coating upon the glass. In my examination of the process described in this patent, I have found that the electrical resistance of the film so produced frequently is too high for many uses.

For example it is frequently advantageous to provide glass or other articles with an electroconductive coating and to impose an electric potential across the coating whereby the film becomes heated during the passage of the current through the film. Articles of this character may be used as space heaters or as viewing closures or as windshields in vehicles, whereby the conductive film serves to heat the glass and prevent accumulation of snow, ice or moisture thereon. In order that such articles shall be suitable for use upon a commercial scale, it is desirable that the resistance of the coating be relatively low. At the same time, it is essential that the coating be transparent and essentially free from optical defects since otherwise vision through the viewing closure may substantially impaired.

When attempts have been made to apply a conductive coating to window or plate glass sheets according to the process described in the above identified patent, the resistance of the film has almost invariably been too high for practical use in the field of viewing closures or space heaters. Application of thicker films has not solved this problem for the reason that the transparency of the films has decreased and the haze factor of the film has substantially increased. Furthermore conductive coatings which are irregular in their conductivity, some portions thereof having much higher resistivity than other portions, frequently are produced.

This difficulty is particularly acute when it is attempted to apply the tin oxide conductive coating to a glass or similar base which has a different coefficient of expansion from that of the electroconductive coating itself. This is particularly true when attempts are made to apply these electroconductive coatings to lime-soda glass such as window or plate glass. Whereas transparent coatings having low conductivity frequently can be applied to borosilicate glass using an aqueous solution of stannic chloride, as described in the above mentioned patent, coatings of much poorer conductivity are obtained when lime-soda glass or other glass having a different coefficient of expansion from that of the coating is so treated.

According to the present invention, many of the difficulties previously encountered have been eliminated. It has been found that products which are more uniform in their resistivity and which have a lower resistivity and a lower haze factor even on lime-soda and similar glass bases, may be obtained by conducting the coating operation in the presence of an hydrazine, such as phenylhydrazine, preferably in conjunction with an alcohol, including monohydric alcohols such as methanol, ethanol or the propanols, butanols, etc. In performance of the process of the present invention, the tin salt such as stannic chloride or other hydrolizable tin salt, is applied to the base while the base is heated at the conventional elevated temperatures, for example 800° F. or above, and the coating aid is applied to the base in conjunction with the tin salts.

Frequently, the tin salt is dissolved in an aqueous solution and the coating aid is added thereto and the entire solution is sprayed upon the heated base. However, other methods of application may be resorted to. For example, a vapor mixture of stannic chloride and vapor of the hydrazine may be applied to a heated base with consequent formation of the desired coating.

It is consistently found that the use of the coating aids herein contemplated in conjunction with the tin compound produces films which are more uniform in their conductivity (or resistivity) and which are more free from minute cracks or similar defects tending to raise the ultimate resistance of the film than are the films which are produced without recourse to these agents. This is particularly true in the case of films which are applied to lime-soda glass. Thus when films of this character are applied to lime-soda glass, such as ordinary window or plate glass, without use of the agents herein contemplated, the films rarely have a resistivity below about 0.02 ohm centimeter. On the other hand when these agents are used, window or plate glass articles which are coated with the film thus obtained are found to have film specific resistivity well below 0.01 ohm centimeter, usually of the order of 0.0015 to 0.005 ohm centimeter. This distinction in ultimate resistivity is somewhat less marked where the glass base has the same coefficient of expansion as the electroconductive film which is being deposited, as is the case when the films are deposited upon borosilicate glass. In such a case the ultimate resistivity of the film do not differ to such a marked degree from those which may be obtained without the use of the agents herein contemplated. Even with borosilicate glass however, films which are more uniform as to their resistivity which tend to remain more constant in resistivity with repeated heating and cooling and which possess less haze are obtained when the reducing agents are similar agents of the type herein contemplated are used and results are more readily reproducible upon a commercial scale as a consequence of the use of these agents.

The agents which are used in conjunction with the tin compound according to this invention, serve to minimize or prevent formation of minute cracks and other defects which tend to interrupt the film and increase its overall resistance. In so doing, they appear to serve as crystallization restraining agents and as extenders. At least to a degree, the advantageous results which are obtained through use of these agents may be due to the fact that their decomposition products are beneficial in the film. Thus it has been found that when the deposition of the film is conducted in the presence of carbon compounds, carbon is almost invariably present in a small amount in the film. This carbon appears to exert some beneficial effects in the production of a film having uniformly low resistivity.

Accomplishment of the foregoing constitutes some of the principal objects of the present invention and the manner by which these and other objects of the invention are attained will be more fully understood by reference to the ensuing description taken with the accompanying drawings in which.

Figure 1:
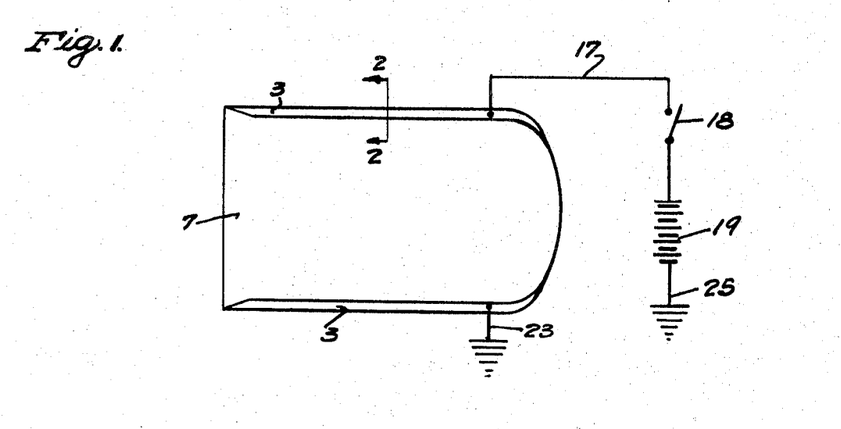
Fig. 1 is a diagrammatic plan view of a glass panel, suitable for use as a windshield of an automobile, embodying the coating produced according to the present invention.
Figures 2, 4:
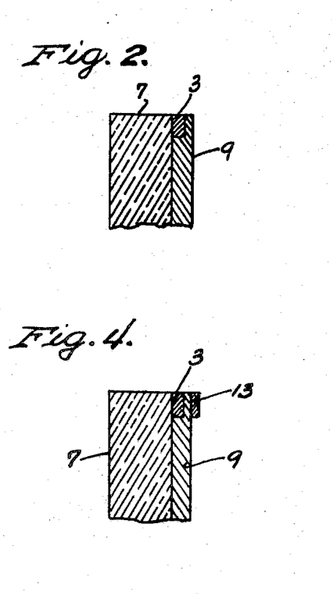
Fig. 2 is a diagrammatic fragmentary sectional view taken along lines 2—2 of Fig. 1.
Figs. 3, 4 and 5 are diagrammatic sectional fragmentary views corresponding to Fig. 2 and illustrating various alternative embodiments which may be utilized in lieu of the embodiment illustrated in Fig. 2.

In the drawings, Figs. 1 and 2 diagrammatically illustrate a heating panel having the wiring diagrammatically illustrated. This panel comprises a glass sheet of generally rectangular shape having bus bars or conductive edge strips 3 of ceramic silver composition along opposite sides and close to the edges (preferably within 0.2 inch of the edge or on the edge) of the sheet. These bus bars are disposed along the longest pair of opposite sides of the panel whereby the distance between the bus bars is held to a minimum.

The panel is provided with an electroconductive transparent film 9 such as is formed by spraying a tin compound or similar compound on the heated panel as previously described. The bus bars are connected to a source of potential 19 by means of conductors 17, 23 and 25, one side of the potential source and one of the bus bars being grounded through conductors 25 and 23 respectively. The conductor 17 is provided with a suitable switch 18 for interrupting the flow of electric current to the film.

In accordance with a suitable method of preparing a heating panel of the type illustrated in Figs. 1 and 2, a glass sheet 7 usually of window or plate glass or other flat glass structure is provided with conducting metal strips 3 suitable for bus bars adjacent the edges thereof and a conducting transparent coating 9. These metal strips should adhere firmly to the glass sheet and should have conductivity at least 10 to 20 times that of the conductive coating 9. In the preferred embodiment these metallized strips are produced by applying a metallized coating strip, usually 0.1 to 1 inch wide, upon the surface of the sheet to be treated. Such strips preferably are close to or on a pair of opposite edges thereof. This metallized coating must be capable of withstanding the temperatures and oxidizing conditions of treatment, and therefore should be of a ceramic character and further should be capable of glazing or otherwise forming an adherent, well-bonded coating to the glass. In general, these compositions comprise a highly conductive metal powder (preferably gold or silver) and a vitrifying binder. Typical ceramic conductive coating materials which may be used may have the following composition:

| | Percent by weight |
|---|---|
| 1. PbO | 7.5 |
| $B_2O_3$ | 1.0 |
| $SiO_2$ | 1.5 |
| Flake silver | 70.0 |
| French fat oil | 12.5 |
| Turpentine | 7.5 |
| 2. Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop in use excessive stresses in the glass, the thickness of the coating to be applied should not exceed about 0.005 inch and preferably should be below about 0.003 inch.

After application of the metal bus bars to the glass sheet by painting or other method, the sheet is heated to the temperature at which application of the conductive coating may be effected, for example above about 600 to 800° F. but below the fusion point of the glass, usually 950 to 1350° F. During this heating operation the ceramic metal coating becomes glazed and is baked onto the glass so that a firm bond is established between the glass and the metal coating.

When the glass has been heated, for example in a furnace chamber having a temperature of 1050 to 1250° F. (for one or two minutes) it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period usually of the order of 2 to 20 seconds depending upon the thickness of film to be produced, the air pressure imposed upon the atomizing spray gun, etc. Usually this spraying operation is conducted in air or oxygen. However, conductive coatings have been obtained even when oxygen is essentially absent although it is probable that oxygen either from the atmosphere or combined in water or similar compound is essential to the operation.

Figure 3:
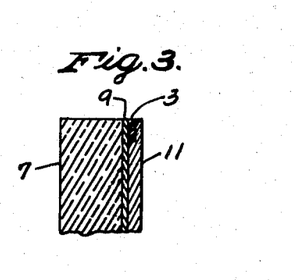

This process results in the production of a base 7 coated with a tin oxide electroconductive film 9 as illustrated in Fig. 2. According to a further embodiment as illustrated in Fig. 3, the glass base 7 may be provided with two or more conductive coatings 9, 11, etc. In such a case it has been found to be more advantageous to deposit the first tin oxide coating upon the glass base and then to deposit the metallized bus bar followed by deposition of the second tin oxide or similar conductive coating. In this embodiment the bus bars are disposed between a pair of coatings. In either case however the bus bar is disposed between the glass base and the transparent conductive coating.

Figure 5:
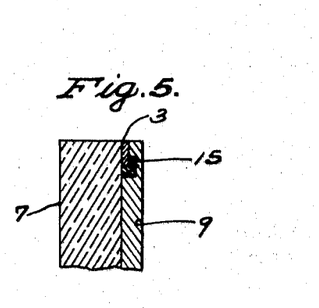

The invention herein may be used in connection with other embodiments. Typical additional embodiments are illustrated in Figs. 4 and 5. As illustrated in Fig. 4, it is frequently desirable to reinforce the ceramic metal bus bar with an additional metal coating after deposition of the conductive transparent film. This is particularly true where the transparent film is deposited as a single coat. Thus a glass base 7 may be provided with bus bars 3 and a transparent tin oxide coating 9 and thereafter a reinforcing coating 13 of a conductive metal paint or paste such as an air drying cement comprising a conductive metal powder, such as silver, copper, gold, etc. and an air drying binder (linseed oil, air curing resins, etc.) may be deposited upon the bus bar or the coating over the bus bar. Furthermore a reinforcing layer of copper, silver or other conductive metal may be deposited by other means such as by electrodeposition, cathode sputtering, dipping, spraying, etc. This reinforcement very substantially improves the conductivity and electrical contact between the bus bar and the conductive transparent coating.

Fig. 5 illustrates an embodiment which is particularly adapted for the establishment of superior electrical contact between the bus bar and the coating. I have found that, when silver is used as the bus bar material, the deposition of the conductive tin oxide or similar coating appears to be hindered and a tendency exists for the coating to be substantially thinner immediately adjacent to the silver bus bar. This reluctance of the conductive film to deposit adjacent to the silver frequently results in the establishment of localized areas having an unusually high resistance immediately adjacent to the bus bar.

According to the present invention it has been found that when gold is used as the bus bar material this difficulty is not encountered and consequently the substitution of gold for silver sometimes is resorted to. However, in order to conserve the amount of gold used applicant has found that an advantageous avoidance of the thinning out of the coating may be attained by use of a very narrow coating of gold along the inner edge of the bus bar. As shown in Fig. 5, a glass base 7 is provided with the usual silver metal bus bar 3 and a narrow strip 15 of gold is deposited along the inner edge of the bus bar 3 and extending inward and overlapping or covering the edge of the bus bar 3. Thereafter the transparent coating 9 is deposited in the usual manner the coating being in contact with the gold strip 15 rather than the bar 3. As a further embodiment the gold strip may be deposited first and thereafter the silver deposited thereafter to leave an inner gold margin which is in electrical contact with the transparent conductive film.

In Figs. 2 to 5 inclusive the tin oxide or similar electroconductive transparent coatings 9 and 11 are shown as thinning out over the bus bars 3. This showing is purely diagrammatic. As previously noted only a slight amount of tin oxide tends to deposit upon the bus bar itself. Often a clearly detectible deposit of the oxide coating on the bus bar may be observed. In other cases the deposit may be so slight as to be unobservable.

Figs. 6 to 9 inclusive, drawn substantially to scale, illustrate an embodiment of this invention which is especially adapted for use as a viewing closure or window in the cabin of an airplane. The panel therein shown comprises a pair of glass sheets 30, 32 which are bonded together with an interlayer 34 of a transparent, tough, flexible, elastic, rubberlike compressible essentially waterproof adherent plastic such as polyvinyl butyral, cellulose acetate, or other convenient interlayer including other vinyl acetals and other vinyl polymers such as vinyl acetal, vinyl acetate, styrene, etc. Since this interlayer is larger in longitudinal and lateral dimensions than the glass sheets 30 and 32, the interlayer extends outward from the edges of the glass sheets to provide a peripheral rim or margin 36. This rim may be reinforced by aluminum strips 38 (Fig. 7) which are embedded therein. This general structure and the manner of mounting the panel in the cabin of an airplane is described more fully in United States Letters Patent No. 2,293,656, granted to T. H. McClain.

Glass sheet 32 is provided with a transparent electroconductive coating (not shown) on its inner side which is in contact with the plastic interlayer. This sheet is generally of the structure illustrated in Figs. 1 to 5 inclusive and is provided with silver bus bars 3 extending along opposite edges thereof. These bus bars are tapered at each end and have the external contour of the glass sheet. They extend substantially completely around the curved edges of the sheet and the taper terminates in a point substantially where the edge of the sheet ceases to be curved.

Figure 6:
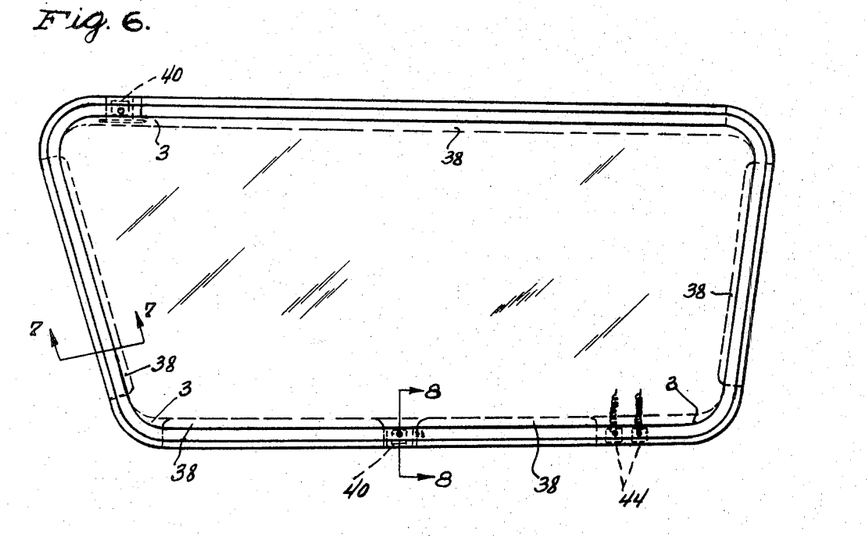
Fig. 6 is a plan view drawn substantially to scale of a typical laminated safety glass panel suitable for use in the cabins of aircraft and having an electro-conductive transparent coating on the surface of one of the glass sheets thereof.
Figure 7:
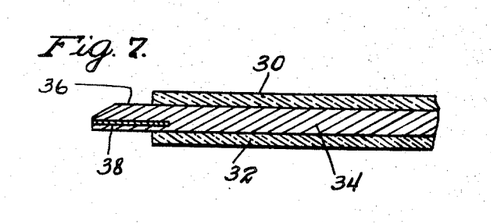
Fig. 7 is a fragmentary sectional view taken along lines 7—7 of Fig. 6.
Figure 8:
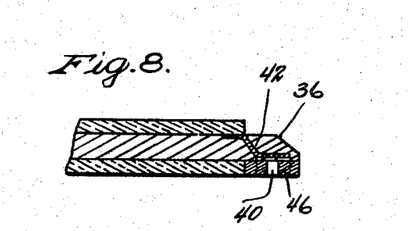
Fig. 8 is a fragmentary sectional view taken along lines 8—8 of Fig. 6.
Figure 9:
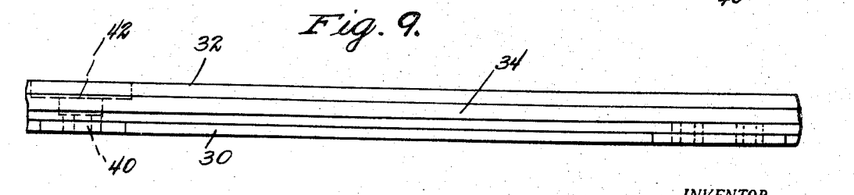
Fig. 9 is a fragmentary view of an edge of the laminated panel of Fig. 6 showing the terminals along the lower edge of the panel.

Frequently, sheets 30 and 32 may be partially tempered after coating to reduce possibility of fracture in use. After the sheet having the electroconductive coating is tempered to a degree less than that in the uncoated sheet 30. For example, the uncoated sheet may be tempered to about one-half of full temper and the sheet 32 tempered to about ¼ to ⅓ of full temper. This tempering frequently tends to reduce the stress which is imposed upon the coating and which normally exists due to the differences in thermal expansion coefficients between the glass and the coating.

Terminals 40, 40 which are in electrical connection with each bus bar are embedded in the rim portion 36 of the interlayer and extend partially therethru. These terminals are tapped to accommodate a screw for connection to a conduit attached to a source of potential. The terminals are each connected to a respective bus bar by means of a connector 42 of copper or similar conductive material which is soldered to the embedded end of the terminal and also to the bus bar (see Figs. 8 and 9).

If desired, a similar pair of spaced conductive terminals 44 of copper or the like are embedded in the interlayer rim on one side of the safety glass panel and spaced from the terminal 40. These terminals 44 may be connected to a resistor which varies in its resistance directly with the temperature. This resistor may be placed against the panel so that its resistance will be a function of the temperature of the panel. Thus the electrical potential imposed across the bus bars may be controlled in accordance with the temperature of the panel simply by connecting the thermal resistor in an auxiliary circuit provided with conventional relays and devices whereby to interrupt or control current flow through the primary heating circuit, when the temperature of the film reaches a predetermined value.

All of the terminals 40 and 44 are located in unreinforced portions of the interlayer rim 36 and project outwardly from the interlayer a short distance generally sufficient to be essentially flush with the outer surface of the glass sheet 30. The outer end of each terminal is surrounded with a protective ring 46 of polyvinyl acetal or similar material.

Figure 10:
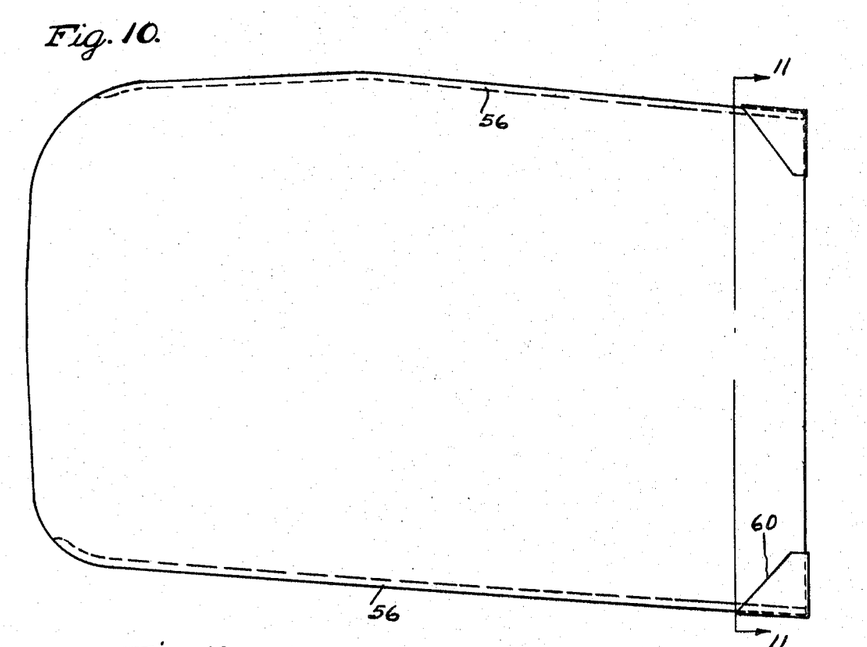
Fig. 10 is a plan view drawn substantially to scale of another laminated panel suitable for use as a windshield.
Figure 11:
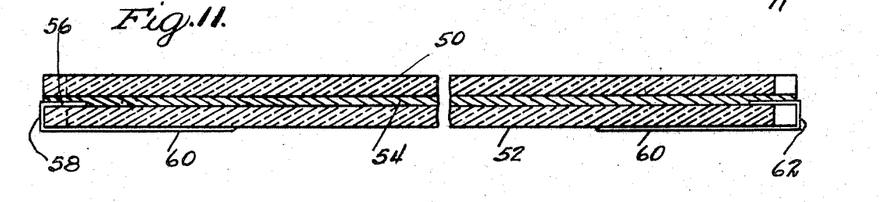
Fig. 11 is a sectional view taken along lines 11—11 of Fig. 10.

Figs. 10 and 11 illustrate a panel adapted especially for an automobile. These drawings illustrate a safety glass panel 51 comprising a pair of glass sheets 50 and 52 cemented together by a plastic interlayer 54 such as polyvinyl butyral. The inner surface of sheet 52 is provided with a transparent electroconductive coating and a pair of bus bars 56 in contact with the coating and running along opposite edges of the sheet. Thus, the interlayer is in direct contact with the electroconductive coating.

Suitable means for applying potential between the bus bars and across the film are provided at the corners of the panel. In the embodiment shown in Figs. 10 and 11 a portion of the edge and outer surface (usually located at a corner of the panel) is coated with a conductive coating such as a ceramic silver coating similar in composition to that of the bus bars. This conductive edge 62 and outer conductive coating 60 is continuous (or substantially so) with the coating comprising the bus bar and the outer conductive presents an electroconductive surface having substantially greater width (usually two or more times) than the width of the bus bar. This affords a good contact surface for establishing electrical contact with a potential source and establishment and maintenance of the potential across the bus bars.

Figure 12:
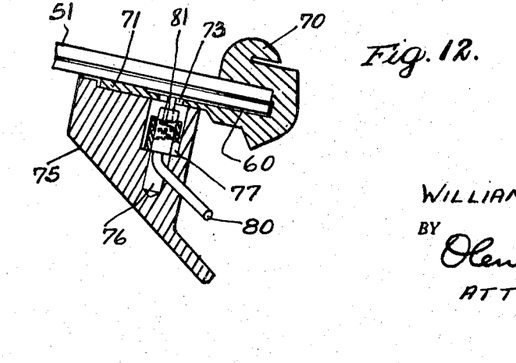
Fig. 12 is a fragmentary view partially in section and diagrammatically illustrating the manner by which electrical contact is made with the panel of Fig. 10 when this panel is mounted in an automotive vehicle.

The manner in which electrical contact is made with the panel of Fig. 10 is illustrated in Fig. 12. This figure is a fragmentary view showing an end of the panel 51 as is mounted in a soft rubber channel 70 which extends completely around the periphery of the panel. This channel is provided with an elongated lip portion 71 which extends along the lower margin of the inner surface panel and which bears against the supporting surface of the cowl 75 to support the windshield in a conventional manner. The lip 71 has an aperture 73 which exposes a small portion of the metallized coating 60. A tubular conduit 77 which has a ledge 79 extends through the cowl and mates with the aperture 73. Electrical contact is established by an electrical conductor 80 which extends through the conduit 77 and terminates in a spring contact 81. This contact is held in place and is supported by the ledge 79. Its conductive end bears resiliently against the conductive face 60 by virtue of the contact spring as will be fully understood by those skilled in the art.

Figure 13:
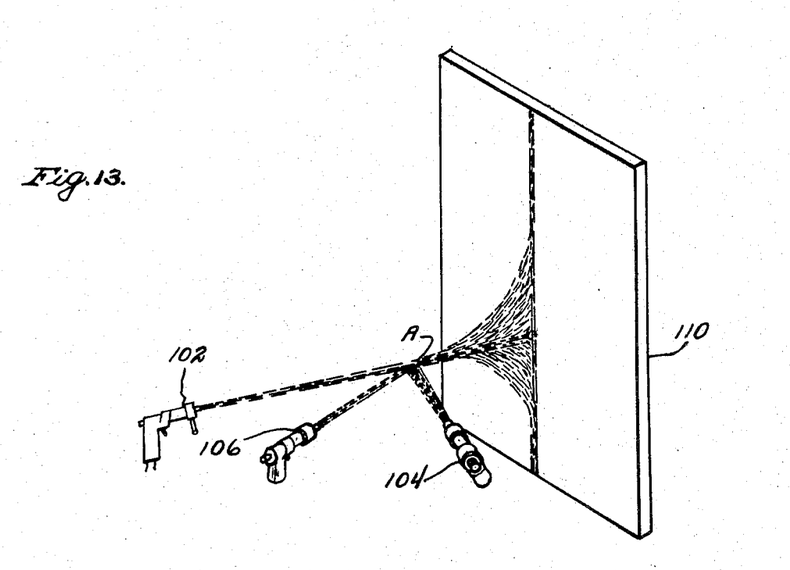
Fig. 13 is a diagrammatic perspective view of an especially effective method of applying the conductive coatings herein contemplated.
Figure 14:
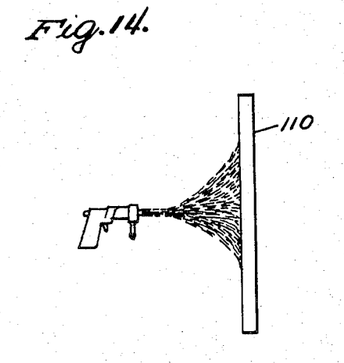
Fig. 14 is a diagrammatic side elevation illustrating the coating method shown in Fig. 13
Figure 15:
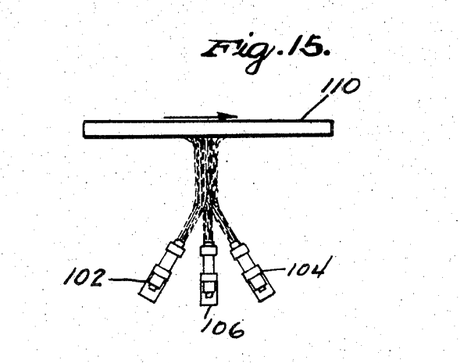
Fig. 15 is a diagrammatic plan view of the method shown in Fig. 13.

Figs. 13 to 15 inclusive, diagrammatically illustrate a method of applying the tin oxide film which has been found to be especially advantageous. It will be understood that the ultimate resistance (or conductivity) of the electroconductive film depends to a very large degree upon the thickness of the film. Other things being equal, the thicker the film the lower its overall conductivity. Thin films frequently do not have sufficiently high conductivity to permit use, particularly where it is desired to use them as viewing closures in a vehicle, such as an automobile. That is, the resistance of the film across the viewing closure or windshield becomes excessive. On the other hand, if the film is unduly thick, it is frequently found that the film is otherwise defective, either due to the presence of haze in a transparent film or due to the fact that the film ultimately becomes opaque as thickness is increased.

Thus in my early investigations I found that in one series of tests, if the heated glass was sprayed for a short time, for example 1 second, a thin transparent coating was obtained which had an excessively high resistance in ohms per unit square. However mere lengthening the time of spray was found to be unsuitable since the coatings obtained had poor transparency.

I have found that transparent films having the required conductivity (below 500 ohms per unit square) and the required freedom from haze (below 5%) may be prepared by application of successive films by heating the glass sheet, spraying with coating solution, reheating and respraying. However this repeated spraying is expensive and increases the ultimate cost of manufacture of the product.

I have found that the multiple spraying operation which for a time was regarded to be essential may be avoided, however, by the embodiment illustrated in Figs. 13 to 15 inclusive. In this embodiment, a pair of nozzles are mounted at an angle so as to direct a pair of sprays of the tin compound or solution thereof toward a focal point and to cause impingment thereof. Usually the spraying nozzle which is used should be capable of establishing an oval type spray and the nozzles are so mounted so as to cause the vertical major axis of each of the oval sprays to be essentially in the vertical position. As a consequence of the impingement of the two sprays, the sprays are caused to fan out vertically thereby producing a thin spray which is rather narrow in cross-section but which is very long and extends a substantial distance across an area through which a sheet may be passed.

In order to increase the speed of the spray, a further nozzle frequently is provided at a point intermediate the other two nozzles and directed toward the focal point of the sprays. Air under pressure is delivered to this central nozzle which blows or drives the spray up against the sheet which is undergoing coating operations.

In the embodiment illustrated a pair of nozzles, 102 and 104, are mounted by suitable means (not shown) so as to impinge at a focal point. A further nozzle 106 is mounted between the other nozzles and directed to the focal point. The angle between the two nozzles, 102 and 104 may be varied to a considerable degree but generally is of the order of 30 to 45°.

The stannic chloride or similar solution is delivered to each of the nozzles, 102 and 104, under pressure, usually air pressure, whereby an atomized spray is delivered from each of the nozzles and the sprays intersect at the focal point. As a result of the impingement at the focal point the sprays fan out upwardly and downwardly to produce essentially a thin spray band of elongated cross-section. Air is delivered from nozzle 106 which normally disposed of a middle point and is directed toward the focal point thereby essentially bisecting the angle between the nozzles 102 and 104. In general the nozzles illustrated are the conventional nozzles of conventional atomizing spray guns. As a consequence of the air blast the thin spray band is forced rapidly outwardly from the focal point. Air pressures normally impressed upon each of the nozzles usually are substantially equal.

In the coating operation, the sprays are started as previously described thereby causing an essentially vertical band of liquid and/or vapor containing the tin compound to a central area. A glass sheet which has been heated in a heating chamber which is heated to the required temperature, above about 600° F., for example 800° to 1250° F., is then held in a vertical position and moved transversely of the spray as illustrated in Fig. 15. As this heated sheet passes through the thin spray, the spray impinges against the exposed sheet surface and the tin oxide or similar film is deposited upon the sheet. A substantially continuous coating upon the exposed surface of the sheet is produced simply by moving the sheet edgewise across the path of the spray so that the spray strikes substantially all areas of the sheet during passage of the sheet therethrough. In general, the width of the sheet is adjusted to be accommodated to the length of the spray so that the sheet will be sprayed substantially equally along its entire width. Where necessary several banks of nozzles such as illustrated in Fig. 13 may be disposed one above the other in order to ensure complete coating of an unusually wide sheet.

This process effectively deposits a tin oxide or similar electroconductive coating upon a glass or similar base having the required transparency and conductivity in a single operation. Consequently the recourse to multiple coating operations, previously thought to be essential, has been substantially eliminated. If desired however this method of coating may be modified to permit multiple spraying by passing the sheet through the spray several times, by moving the sheet back and forth through the spray or by holding the sheet stationary and moving the spray back and forth over the sheet or by using a plurality of sprays through which the sheet is passed.

The invention and novel features heretofore described may be varied to a considerable degree. As an example various types of ceramic metallizing compositions preferably those which have a thermal coefficient of expansion approximately that of the base may be used for production of the bus bars. Such compositions may comprise a finely divided highly conductive metal disposed in a binder which is capable of establishing adhesion to the glass base and/or the coating and which is also capable of resisting heat and decomposition at 900 to 1500° F. For most purposes it is found desirable to utilize a vitrifying flux or binder which is capable of forming a glass or glass-like product upon fusion or heating to high temperature. Thus, aqueous suspensions or dispersions of hydrated colloidal silica, sodium silicate or other alkali metal silicate, or alkali metal or beryllium metaphosphates or metaborates, boron oxides, borosilicate forming compositions including lead borosilicate compositions, etc. are suitable for this purpose. Various other vitrifying glass forming adhesive compositions which are capable of withstanding heating at 900 to 1200° F. also are capable of use. Furthermore, strips or foils of metal may be bonded by a glaze or vitrifying binder for use as a bus bar.

Although the invention has been described particularly with reference to the use of silver or gold compositions dispersions of other electroconductive metals including platinum, palladium, indium, irridium, rhodium, tungsten, etc. which resist oxidization may be used.

Furthermore, these ceramic bus bars may be reinforced as previously stated by a further coating of a conductive metal including the conductive metals above mentioned, copper, zinc, graphite, etc. in concentration sufficient to render a coating thereof highly conductive.

The bus bars at all events should be many times more conductive than the transparent films in order to prevent or avoid establishment of an undue amount of hot spots. For most purposes the total resistance of each bus bar should be not more than 1 to 5 percent of the resistance of the transparent coating between the bus bars.

A wide variety of alcohols may be used to assist the production of an electroconductive tin oxide film according to this invention. Especially good results have been obtained using lower aliphatic alcohols containing up to 8 carbon atoms, particularly water soluble monohydric alcohols. Thus films having low resistivity may be produced using stannic chloride in conjunction with methanol, ethanol, isopropanol, n-propanol, isobutanol, n-butanol, tertiary butanol, the amyl and hexyl alcohols or 2-ethyl hexanol or other octanol, or the lower unsaturated alcohols such as allyl, methallyl, crotyl, 2-ethyl allyl, propargyl, or beta methyl propargyl alcohols. Furthermore aryl or aralkyl alcohols such as benzyl alcohol, cinnamyl alcohol, may be used. Other compounds which contain alcoholic groups including glycols such as ethylene glycol, propylene glycol, n-butylene glycol, isobutylene glycol, trimethylene glycol, tetramethylene glycol, or 2-ethyl hexane diol and polyglycols such as diethylene glycol, triethylene glycol, dipropylene glycol, etc. and other polyhydroxy alcohols such as glycerol, erythrol, erythritol, phthalyl alcohol and hydroxy acids containing hydroxy groups esterifiable by acids such as glycollic acid, lactic acid, salicylic acid, beta hydroxy butyric acid and the methyl, ethyl and other esters of such acids and other substituted alcohols such as ethylene chlorohydrin propylene mono- or dichlorohydrin, 2-chloroallyl alcohol, 2-nitro propanol, phenol, hydroquinone, etc. also may be used in accordance with this invention. Furthermore higher alcohols such as cetyl alcohol, myristyl alcohol, lauryl alcohol, cinnamyl alcohol, oleyl alcohol, etc. may be used for this purpose. Hydrazines suitable for use according to this invention include organic hydrazines such as phenyl hydrazine hydrochloride, diphenyl hydrazine, methyl hydrazine, ethyl hydrazine or the corresponding hydrochlorides thereof have been found to be especially useful. These agents are particularly valuable when used in conjunction with alcohols such as methanol, ethanol, the propanols or butanols.

It has been found that where very thick films are deposited upon borosilicate glass, "Pyrex" which has a coefficient of expansion of about $3.3 \times 10^{-6}$, the maximum conductivity of the tin oxide film (about 0.0015 ohm centimeter) may be obtained without recourse to addition agents such as methanol. This is not true when films are deposited upon lime soda glass which has a coefficient of expansion of about $8 \times 10^{-6}$. The addition agents herein disclosed appear to function at least partially to minimize development of minute film cracks by increasing the ductility of the film and/or by changing its coefficient of expansion and/or by depositing conductive atoms or ions (carbon, metallic tin, stannous tin, chloride, etc.) in the film whereby to ensure optimum conductivity despite any difference in expansion coefficient between the film and the base upon which it is deposited. Consequently the present invention contemplates the use of compounds of carbon, sulphur, oxygen and nitrogen which upon pyrolysis at 750 to 1350° C. or above yield these elements or a gaseous compound thereof and the film obtained through their use are more uniform in conductivity and are closer to maximum conductivity than when no addition agent is used. This is particularly true in the case of coated lime-soda glass.

The amount of hydrazine or alcohol which is used is capable of substantial variation depending upon the results desired. Small amounts (even traces) show an improvement in the conductivity and freedom from haze of the film and such improvement increases to a maximum as the amount of addition agent is increased. In general the amount of such agent which is used in conjunction with the tin compound at least 0.01 to 0.1 mol per mol of tin compound. As an example with agents such as methanol or similar alcohol it has been found that a solution comprising 1000 parts by weight of $SnCl_4.5H_2O$ and 1 part by weight of methanol produced a film having a specific resistivity of about 0.012 ohm centimeter whereas a solution containing equal parts by weight of stannic chloride pentahydrate and methanol produced a film having a specific resistivity below 0.002 result in further improvement of the film and it is quite rare to use more than 50 parts by weight of addition agent per part by weight of tin compound.

Quite frequently, mixtures of agents have been found to be preferable. For example alcohols such as methanol or others above listed are found to function better when used with hydrazines such phenyl hydrazine or phenyl hydrazine hydrochloride or the other hydrazines or their hydrochlorides such as above listed. In such a case at least 0.01 mol of the hydrazine such as phenyl hydrazine and 0.01 mol of the alcohol such as methanol, per mol of tin compound such as stannic chloride normally are used.

The invention has been described with special reference to the use of stannic chloride as the tin compound for production of the electroconductive film. This compound is particularly valuable since it may be used either in aqueous medium or in vapor state to produce films which visibly appear to be flawless. Other stannic compounds such as stannic bromide $$SnBr_3Cl, SnBrCl_3, SnCl_2I_2, SnI_4$$

stannic sulphate, stannic phosphate, stannic nitrate or stannous salts such as stannous acetate, stannous oxalate, stannous chloride, stannous nitrate, stannous tartarate may be used. Organic tin compounds also may be used. Such compounds may include those having the structure $R_mSnX_n$ where R is a monovalent aryl, aliphatic, or arylaliphatic radical linked to the tin atom through carbon and X is another monovalent aryl, aliphatic or arylaliphatic radical linked to the tin atom through carbon or is a radical such as hydride, hydroxyl, chloride, bromide, iodide, etc. and the sum of $m$ and $n$ is 4, such as tetra ethyl tin, tetra methyl tin, tetra-n-heptyl tin, tetra-di-amyl tin, tetra-benzyl tin, tetra phenyl tin, tetra p tolyl tin, tetra p xylyl tin, tribenzyl ethyl tin, tribenzyl tin chloride, tributyl tin chloride, triethyl-n-amyl tin, tolyl tin trichloride, ethyl tin tribromide, ethyl stannic acid, ethyl chlorostannic acid, diethyl tin oxide. Moreover other tin compounds such as diphenyl tin, diethyl tin, stannic bis acetylacetone dichloride or dibromide, etc. may be used.

In general it is desired to use tin compounds which are liquid or which may be vaporized readily or which may be dissolved in solvents such as water or organic solvents such as benzene, xylene, toluene, acetone, methanol ethanol, methyl ethyl ketone, etc., in order that the tin compound may be applied to the base as a homogeneous liquid or solution. Such solutions normally contain at least 10 to 50 parts by weight of tin compound per 100 parts by weight of solution.

When an aqueous solution of stannic chloride is used, some difficulty may be encountered with certain reducing agents due to the fact that a precipitate may tend to form in the solution and such precipitation may tend to cause haze or even formation of an opaque film. Consequently, when aqueous solutions are used it is desirable to utilize a reducing agent which does not effect its solution reduction at room temperature. This problem is not so acute when stannic chloride vapor is used since in such a case vapors of the reducing agent and the stannic chloride are mixed in the nozzle of the spray gun and atomized together before a high degree of reaction can occur. In such a case, by high speed impingement of the reducing agent and stannic chloride vapor against the glass surface, the predecomposition of the stannic chloride and consequently haze formation will be avoided.

Typical solutions which have been tested are as follows:

1. 90% by weight $SnCl_4.5H_2O$,
    10% by weight formaldehyde aqueous solution (containing 40% formaldehyde).
2. 900 grams $SnCl_4.5H_2O$,
    21 grams phenyl hydrazine hydrochloride
    90 milliliters methanol.

As previously stated, the invention has been found to be especially valuable when used in the coating of window and plate glass which are made of lime-soda glass. Such glass usually has the following composition:

| | Percent by weight |
|---|---|
| $Na_2O$ | 10 to 15 |
| $CaO$ | 5 to 15 |
| $SiO_2$ | 70 to 75 |
| $MgO$ | 2 to 10 |

A typical lime soda glass used as window glass has the following composition:

$SiO_2$—71.38 percent by weight (usual variation 71 to 73% by weight)
$Na_2O$—12.79 percent by weight (usual variation 12 to 14% by weight)
$CaO$—9.67 percent by weight (usual variation 8 to 11% by weight)
$MgO$—4.33 percent by weight
$Na_2SO_4$—0.75 percent by weight
$NaCl$—0.12 percent by weight
$Fe_2O_3$—0.15 percent by weight
$Al_2O_3$—0.81 percent by weight The products obtained by this process comprising lime-soda (plate or window) glass with the conductive tin oxide coating thereupon (produced using an agent such as methanol) have a Hall Factor of about 0.01 to 0.04 cubic centimeter per ampere second (as determined by the method described in "Galvanomagnetic and Thermomagnetic Effects," by L. L. Campbell, published 1923 by Longmans & Green, pages 8 to 26 inclusive) whereas when no methanol or similar agent was used the Hall constant was 0.09.

Other pertinent properties of these films on lime-soda glass are:

Mobility, $cm.^2$/volt second ____ 8
No. ionized impurity centers per $cm.^3$ ____ About $10^{20}$
Mean free path of current carriers ____ About $6 \times 10^{-6}$ cm.
Index of refraction of film ____ About 2

Because of the lower specific resistivity of the films produced according to this invention plate or window glass provided with conductive films of high transparency have a resistance per unit square below 500 and generally less than 150 ohms per unit square and a haze factor below 5 percent.

The expression of resistance in terms of ohms per unit square is a convenient means of expressing the resistance of thin films; this resistance in fact being the specific resistivity of the film divided by the average thickness of the film within the unit square.

The haze factor is measured by a method designated "A tentative method of industry for transparent plastics by photoelectric cell," described in the publication "A. S. T. M. Standards," 1944, part 3, pages 1653–5, American Society Testing Materials, New York.

The problem of producing products which are haze-free or at least exhibit but little haze is quite serious and it is frequently found that an excessive number of sheets which have an unduly high haze factor are produced when the process is conducted upon a commercial or semicommercial scale.

While the exact cause of haze in films of this character has not been determined with absolute certainty haze appears to be caused by a number of factors. For example premature decomposition of stannic chloride or similar compound whereby tin oxide is formed at a point spaced from the hot glass sheet and subsequently is swept onto the sheet is at least one cause. At all events the agents used according to the present invention appear to aid in minimizing haze. Further precautions also serve to minimize haze. Thus it has been noted that haze tends to develop unless the conversion of the stannic chloride or similar compound to the corresponding metal oxide occurs immediately adjacent to or on the hot glass surface. Otherwise minute particles of tin oxide or hydrated tin oxide tend to be formed in an opaque condition and to be swept onto the glass surface and entrapped by the deposited film. Avoidance of a high degree of haze may be attained by making certain that the atomized stannic chloride spray is impinged at high speed upon the glass surface. Avoidance of haze may also be minimized by proper co-adjustment of the distance between the nozzle of the spray gun and the glass surface with the air pressure on the spray gun. Moreover, provision of means for rapid removal of the fog which is formed by the spraying operation and which is spaced from the plate to be treated, frequently assists to prevent or minimize haze.

The color characteristics of the coating are determined to a substantial degree by the thickness of the coating. Colorless coatings may be obtained by use of tin oxide or similar coatings which are below about 75 to 100 millimicrons in thickness. Thicker coatings having a thickness of 75 to 500 microns possess a color depending upon the exact thickness. This color is due to the reflection of certain bands of light at particular coating thicknesses whereby interference colors are produced. Where the thickness of the coating is irregular, different colors will be reflected at different areas of the coating and iridescence is produced. This iridescence is objectionable from the standpoint of appearance.

*Example 1*

Using a solution containing 100 parts by weight of fused $SnCl_4.5H_2O$, 10 parts by weight $H_2O$ and 2.5 parts by weight phenyl hydrazine hydrochloride, 5 milliliters of the solution is introduced through a thistle tube into an atomizer of the spray gun type connected to an outlet supplying air under 50 pounds per square inch pressure. A glass plate 5/64 inch in thickness and six inches square is placed on a rack having an inclined support which in turn rests on a conveyor. The plate is heated at 1150° F. in an electric furnace for two minutes, fifteen seconds, being then quickly withdrawn and immediately sprayed with the entire contents of the thistle tube, the spraying requiring a trifle less than three seconds. The distance from the spray nozzle to the plate is kept constant at a value between one and two feet. After spraying entire area of the plate it is allowed to cool in air until it can be handled after which it is washed with distilled water and polished with a dry cloth. The average resistivity of six plates coated under conditions identical to those above is 371 ohms per square unit of surface area and the average haze percentage measured by the A. S. T. M. method described above is 1.3.

For purposes of comparison with the prior art, plates of the same thickness and dimensions were treated under identical conditions excepting that the coating fluid employed contained 100 parts fused $SnCl_4.5H_2O$, 1.67 parts $H_2O$ and no reducing agent. With seven plates so treated the average resistivity was 907 ohms per square unit of surface area and the average haze percentage 1.1.

When plates are coated with more than one application of the coating fluid containing phenylhydrazine hydrochloride or another equivalent reducing agent according to my invention, the resistivity of the film is further diminished considerably while the average haze percentage is not increased to an objectionable point. For instance, when two coatings of 5 ml. each were applied to plates in the manner described above in connection with Example 1 the average resistivity of the plates was reduced to 132 ohms per square unit of surface area while the average haze percentage increased only 2.1, a quite acceptable figure.

On the other hand, when the coating fluid is of the Littleton type in which no reducing agent is incorporated, 5 coatings of 5 ml. each were required to bring the resistivity down to 575 ohms with the result that the haze percentage was increased to 10.1. This is greatly in excess of an acceptable figure for closures glazed for viewing purposes.

Example 2

In a series of tests polished plate glass sheets 4 inches by 8 inches by 7/64 inch were heated for 2¼ minutes at a furnace temperature of 1250° F. Stannic chloride solutions were made up using the agents listed below in the proportion of 10 parts by volume of the agent to 5 parts by weight of stannic chloride pentahydrate. 15 grams of each mixture was sprayed upon the heated glass plates and the plates were allowed to cool. Average resistances of the coatings were as follows:

| Agent | Resistance, Ohms per unit square | Appearance |
| --- | --- | --- |
| Methanol | 100 to 200 | clear. |
| Ethanol | 150 to 300 | Do. |
| n-Propanol | 160 to 300 | Do. |
| Isopropanol | 75 to 150 | slight haze. |
| Isobutanol | 100 to 300 | clear. |
| Isoamyl alcohol | 150 to 300 | Do. |
| Methyl amyl carbinol | 100 to 200 | Do. |
| Cyclohexanol | 200 to 400 | slight haze. |
| Cellosolve | 150 to 300 | clear. |
| Butyl Carbitol | 150 to 300 | Do. |
| Cellosolve acetate | 110 to 300 | slight haze. |
| Carbitol acetate | 250 to 350 | Do. |
| Methylene dichloride | 100 to 250 | clear. |
| Ethylene chlorohydrin | 300 to 1,000 | Do. |
| Dipentene | 140 to 250 | Do. |
| Thionyl chloride | 100 to 150 | Do. |
| Hydroxyl amine | 100 to 150 | Do. |

Other agents including the following produced coatings, when used according to the process of Example 3, which had resistances of 50 to 400 ohms per unit square:

Diacetonyl alcohol
Diethyl ketone
Methyl isobutyl ketone
Cyclohexanone
Methyl acetate
Ethyl acetate
Butyl acetate
Butyl butyrate
Amyl acetate
Nitro methane
1-nitropropane
Formic acid
Methyl amyl acetate
Ethyl ether
Triamyl amine
Butyl ether
Cellosolve acetate
Carbitol acetate
Methyl Cellosolve acetate
Propylene glycol Somewhat higher resistances are obtained using agents such as:

Acetic anhydride
Glacial acetic acid
t-Butyl perbenzoate

Solid precipitates are formed when stannic chloride is reacted with agents such as furfuryl alcohol, isophorone, dipentene or monomethyl amine, triamyl amine or other alkyl amines. These precipitates may be rubbed on glass plates heated to 1200° F. and a clear coating can be produced.

Example 3

An aqueous solution comprising 4 grams of stannous acetate, 30 milliliters of methanol and enough 12 N (37%) aqueous HCl to cause the stannous acetate to dissolve was prepared. This solution was allowed to stand or age in air overnight. 5 milliliters of the aged solution was sprayed in five seconds from an atomizing nozzle at an air pressure of 30 p. s. i. and the spray directed against a glass sheet 8 inches by 4 inches by 7/64 inch which had been subjected to a furnace temperature of 1250° F. for 2¼ minutes. Upon removal of surface powder by brushing the treated sheet after cooling, a very clear adherent essentially colorless coating was found to be present on the glass. This coating was approximately 50 to 75 millimicrons in thickness. Its conductivity was 650 to 700 ohms per unit square.

Example 4

A battery of three De Vilbis spray guns capable of spraying an atomized spray of oval cross section were mounted in a row so that their nozzles were directed substantially in a horizontal plane toward a focal point essentially as shown in Figs. 13 to 15 inclusive. The two outer guns were directed so that the angle between the nozzles was approximately 30 degrees. The middle gun was mounted so that the nozzle was directed toward the focal point of the outer nozzles and approximately bisected the angle between the two outer nozzles. Each of the nozzles was mounted so that the end of the nozzle was approximately 11 inches from the focal point.

A sheet of glass 17 x 25 x 7/64 was vertically suspended, narrow sides being in a horizontal plane, and was heated in a furnace chamber at a temperature of 1150° F. for 3 minutes. The two outer guns were filled with a solution prepared by mixing the following components in the proportions specified:

Stannic chloride pentahydrate ____grams__ 900
Methanol ____________________milliliters__ 63
Phenyl hydrazine ________________gram__ 21
Dioctyl sodium sulfosuccinate solution
    milliliters__ 30
This solution composed of:
    Dioctyl sodium sulfosuccinate__grams__ 10
    Methanol ________________milliliters__ 45
    Water __________________________do____ 45

Spray guns were turned on; the air pressure imposed in the two outer guns being 80 pounds per square inch and in the middle gun 80 pounds per square inch. The middle gun was left empty. In consequence the spray from the two outer guns impinged and caused the spray to fan out in a vertical direction whereby a relatively narrow high speed stream of spray of rectangular cross section was produced. This stream was blown forward by the blast of air from the middle nozzle.

Immediately after the heating period, the glass sheet was held vertically with its front face perpendicular to the middle nozzle and was moved across the spray so that the guns were directed at a point midway between the top and bottom edges of the sheet. The sheet was held approximately 4 inches from the focal point. Under these conditions a long thin band of spray was blown against the hot glass surface forming a coating as the sheet moved across the spray.

The air blast from the middle nozzle caused rapid movement of the spray toward the sheet whereby conversion of stannic chloride to tin oxide before the spray struck the sheet was substantially minimized. Furthermore the air blast aided in creating a draft across the sheet toward the side edges thereof thus minimizing opportunity for fog created by the spray from contacting the sheet and rapidly removing excess and partially decomposed spraying solution from the surface of the sheet. This process substantially minimized haze.

The rate of moving the sheet across the spray was such as to require approximately 6 seconds. During this period approximately 20 cc. of solution was sprayed from each gun. Following the spraying operation, the sheet was tempered to a temper of approximately one fourth that of full temper.

The resulting sheet had a transparent iridescent tin oxide coating which had a resistivity of approximately 125 ohms per unit square. The thickness of the coating was approximately 350–400 millimicrons.

*Example 5*

A glass plate, six inches square and 7/64 inch thickness of plate glass having the following composition:

| | Percent by weight |
|---|---|
| $SiO_2$ | 71.52 |
| $Na_2O$ | 13.02 |
| $CaO$ | 11.62 |
| $MgO$ | 2.52 |
| $NaSO_4$ | 0.76 |
| $NaCl$ | 0.12 |
| $Fe_2O_3$ | 0.11 |
| $Al_2O_3$ | 0.33 | was heated on a hot plate until the under surface of the plate was at a temperature of 600° C. Heating at this temperature was continued throughout the process.

Approximately 100 cubic centimeters of stannic chloride was placed in a receptacle having a volume of about 500 cubic centimeters and the stannic chloride was heated to 105° C. Approximately 100 cubic centimeters of anhydrous methanol was placed in a 500 cubic-centimeter flask and heated to 50° C. A stream of dry air was passed over the heated stannic chloride at a rate of 30 cubic centimeters of air per second and a separate stream of dry air was placed over the heated ethanol at a rate of 3 cubic centimeters per second. These air streams, which were slightly below saturation as to their respective vapors, were mixed and the mixture was allowed to flow directly through a quarter inch pipe which was directed downwardly toward the upper surface of the heated plate (which was suported horizontally) at one end of the plate and at an angle of about 30 degrees from the horizontal and in the direction of the opposite end of the plate. A suction was applied at the opposite end of the plate. By this means the mixture of air, stannic chloride and alcohol was distributed laterally of the nozzle and caused to flow across the plate. The effect of the suction is to remove tin oxide and similar compounds which are produced at points spaced from the glass surface and thereby to minimize haze formation.

The flow of air and stannic chloride and alcohol vapor was continued for 60 seconds during which the vapor mixture flowed over the hot glass plate and a transparent tin oxide coating which exhibited interference colors was found. Upon cooling, the glass was found to have a conductive transparent film therein which was in thickness of $540 \times 10^{-7}$ centimeters. This coating had a specific resistance of about $2 \times 10^{-3}$ ohm centimeters.

When this process was repeated omitting the alcohol, a glass plate having a coating which had a specific resistance of above $10 \times 10^{-3}$ ohm centimeters was obtained.

*Example 6*

The process of Example 5 was repeated using several other liquids in lieu of methanol, using the conditions of Example 5 except as otherwise specified in the following table:

| Agent used in lieu of anhydrous methanol | Temperature of agent, °C. | Ratio of air flow over $SnCl_4$ to air flow over agent | Time of treatment, seconds |
|---|---|---|---|
| Acetone | 50 | 10 to 1 | 60 |
| Benzene [1] | 65 | 10 to 1 | 60 |
| Carbon Tetrachloride | 65 | 10 to 1 | 60 |
| Acetylene [2] | 25 | 2 to 1 | 60 |

[1] Nitrogen used in lieu of air.
[2] Nitrogen used in lieu of air and the mixture comprised approximately 50 parts by volume each of acetylene and nitrogen.

In the above tests, the products produced were found to have a transparent coating which had conductivity substantially equal to that of the product of Example 5.

While the advantages which accrue according to the invention are especially marked when applied to treatment of lime-soda glass such as commercial window or plate glass, other bases may be coated for the purpose of improving their thermal stability or improving other properties. Thus even borosilicate coated products exhibit a tendency to increase in resistance as the films are alternately heated and cooled.

The use of the agents herein described in conjunction with the tin compound, naturally increases the stability of the film conductivity in such cases. Thus the invention may be used to provide coatings upon various glass or refractory articles such as borosilicate glass, china, porcelain, mica, phosphate glass, stone, lead X-ray glass, silicon carbide, tungsten carbide, aluminum oxide, asbestos, glass fiber, and various other bases including metals such as iron, copper, tungsten, etc. having melting points above 1050° F.

Although the present invention has been described with reference to the specific details of certain embodiments thereof, it is not intended that such details shall be regarded as limitations upon the scope of the invention except insofar as included in the accompanying claims.

What is claimed:

1. In the method of applying an electroconductive film to a base by contacting the base while hot with a tin compound, the improvement which comprises simultaneously contacting the base with an hydrazine during application of the film.

2. In the method of applying an electroconductive film to a glass base by contacting the base while hot with a tin compound, the improvement which comprises simultaneously contacting the base with phenyl hydrazine during application of the film.

3. In the method of applying an electroconductive film to a glass base by contacting the base while hot with stannic chloride, the improvement which comprises simultaneously contacting the base with an hydrazine during application of the film.

4. In the method of applying an electroconductive film to a glass base by contacting the base while hot with stannic chloride, the improvement which comprises simultaneously contacting the base with phenyl hydrazine during application of the film.

5. In the method of applying an electroconductive film to a base by contacting the base while hot with stannic chloride, the improvement which comprises simultaneously contacting the base with phenyl hydrazine hydrochloride during application of the film.

6. In the method of applying an electroconductive film to a base, the improvement which comprises simultaneously contacting the base while hot with an aqueous solution of stannic chloride, phenyl hydrazine hydrochloride, and ethyl alcohol during application of the film.

7. The process of claim 1 in which the hydrazine is phenyl hydrazine hydrochloride.

WILLIAM O. LYTLE.

REFERENCES CITED

The following references are of record in the file of this patent:

UNITED STATES PATENTS

| Number | Name | Date |
| --- | --- | --- |
| 2,118,795 | Littleton | May 24, 1938 |
| 2,363,354 | Peacock | Nov. 21, 1944 |
| 2,429,420 | McMaster | Oct. 21, 1947 |

---

UNITED STATES PATENT OFFICE

CERTIFICATE OF CORRECTION

Patent No. 2,614,944                            October 21, 1952

William O. Lytle

It is hereby certified that error appears in the printed specification of the above numbered patent requiring correction and that the said Letters Patent should read as corrected below.

Column 8, line 31, for "lower" read -- higher --; column 14, line 33, for "microns" read -- millimicrons --.

Signed and sealed this 28th day of May 1957.

(SEAL)
Attest:

KARL H. AXLINE
Attesting Officer

ROBERT C. WATSON
Commissioner of Patents